No. 736,034.  
PATENTED AUG. 11, 1903.
J. STEVENSON.  
CHANGEABLE PICTURE.  
APPLICATION FILED JAN. 15, 1901.
NO MODEL.
Witnesses.  
Inventor,  
John Stevenson,  
by  
Attorney.

No. 736,034. Patented August 11, 1903.

UNITED STATES PATENT OFFICE.

JOHN STEVENSON, OF EDINBURGH, SCOTLAND.

CHANGEABLE PICTURE.

SPECIFICATION forming part of Letters Patent No. 736,034, dated August 11, 1903.

Application filed January 15, 1901. Serial No. 43,402. (No model.)

*To all whom it may concern:*

Be it known that I, JOHN STEVENSON, a subject of the King of Great Britain and Ireland, and a resident of 4 Albert Terrace, Trinity, Edinburgh, county of Mid-Lothian, Scotland, have invented a certain new and useful Changeable Picture, (for which I have made application for Letters Patent in Great Britain, No. 17,783, dated the 6th of October, 1900,) of which the following is a specification.

My invention relates to an improved method of representation of designs or characters upon paper, cloths, or other material; and the object of the invention is to enable a gradually-changing effect in the designs to be obtained under the action of light or internal chemical action or chemical action resulting from exposure to the atmosphere.

My invention consists in forming the designs by means of a pigment or die, one or more of the constituents of which may be non-permanent in color, while the remainder is or are permanent, or relatively so.

The invention further consists in the formation of a composite design or device printed or indicated in a mixture of permanent and non-permanent colors.

In carrying my invention into effect I employ for making a design a pigment or dye which is of a composite character, one or more of the colors forming it being permanent, while the remainder is or are non-permanent, the joint color effect when the pigment or dye is first applied to paper or other material being that due to the mixture of the several colors composing the pigment. When the design is exposed to the action of light or to the atmosphere, the non-permanent color or colors will disappear, and consequently the ultimate color of the design will be different from what it was when the pigment was first applied. If, for instance, an orange pigment be formed by mixing a permanent red with a fugitive yellow and to the orange there be added a red more fugitive than the yellow and to the red orange thus produced there be added a red purple which is even more fugitive than the non-permanent red, a fugitive russet pigment is produced. With the russet pigment words or designs may be painted on a card or the like. After a short exposure to the light the red purple disappears and leaves the words in red orange. Further exposure to light causes the fugitive red to disappear, thus leaving orange, and on still further exposure the non-permanent yellow disappears and leaves the words in permanent red. The designs or words thus appear in four colors in succession—*i. e.*, russet, red orange, orange, and red.

In applying my invention to a picture such as that outlined in the accompanying drawing the leaves and stem of the flower may be printed with a permanent green; but the rose may be printed with a pigment composed of a little permanent white and a non-permanent yellow and red, the shading or outline of the rose being done with permanent black. If the red color largely predominates and is more fugitive than the yellow, the rose will be almost red at first; but on exposure to the light the red gradually fades and leaves the rose a yellow shade. Further exposure to light fades the yellow and leaves the rose a permanent white.

It will be obvious that according to my invention many varied effects pleasing to the eye may be produced.

Having now described my invention, what I claim as new, and desire to secure by Letters Patent, is—

1. The process of producing pictures, consisting of printing a representation in one or more permanent colors in combination with two or more colors which have different degrees of non-permanency when exposed to light, and then exposing the representation to the action of light, whereby the non-permanent colors disappear in succession and leave a representation in permanent color.

2. As a new article of manufacture, a changeable picture consisting of a representation printed in colors, a number of which are non-permanent and have different degrees of non-permanency and disappear when exposed to light, the others being permanent, whereby a variety of effects is produced by merely exposing the representation to light.

In witness whereof I have hereunto set my hand in presence of two witnesses.

JOHN STEVENSON.

Witnesses:
JOHN GRAY,
HERBERT A. MARSHALL.